Aug. 24, 1926.
J. SACHS
1,597,484
INCLOSED SWITCH ATTACHMENT
Filed Jan. 13, 1922
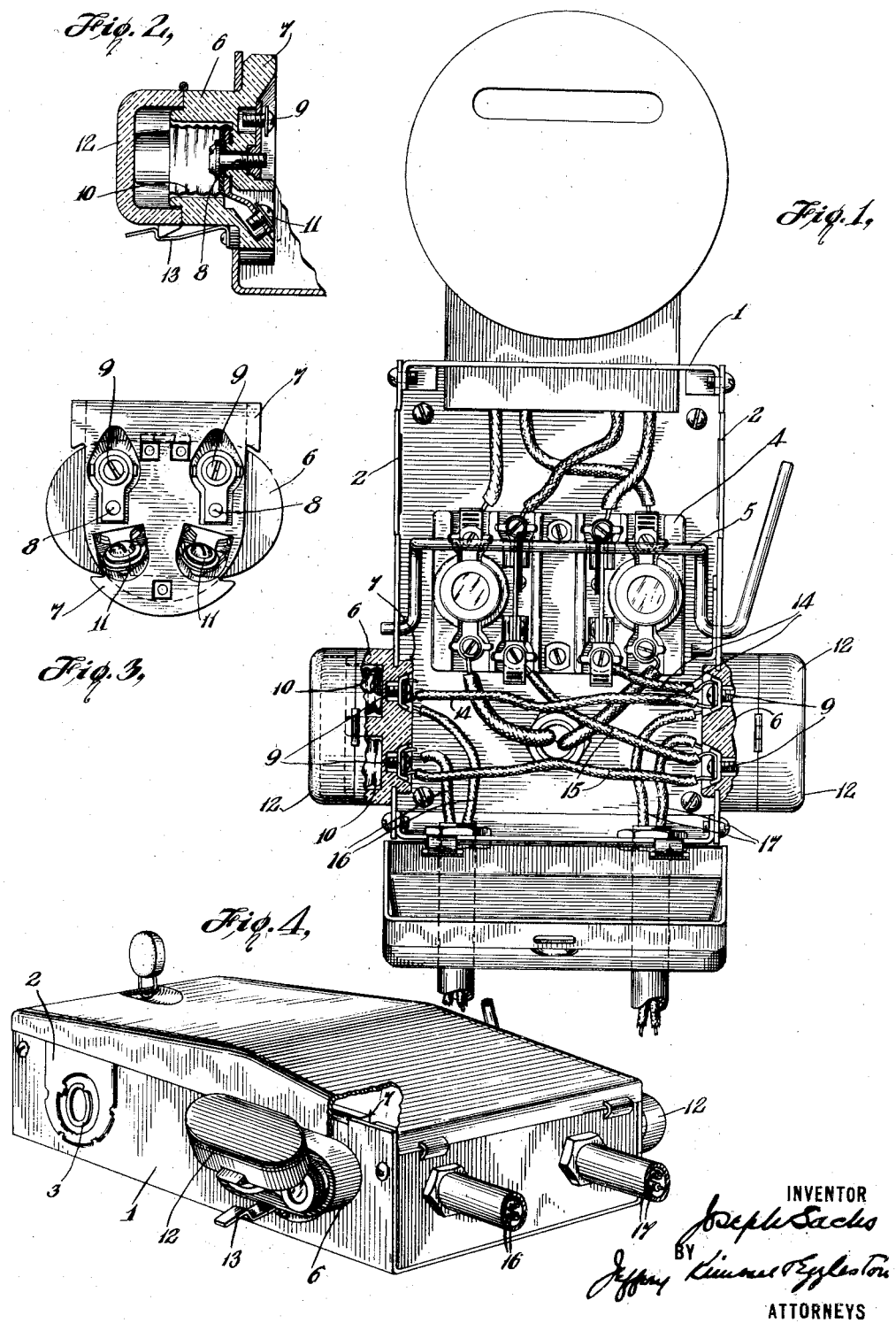
INVENTOR
Joseph Sachs
BY
ATTORNEYS Patented Aug. 24, 1926.

1,597,484

UNITED STATES PATENT OFFICE.

JOSEPH SACHS, OF HARTFORD, CONNECTICUT.

INCLOSED SWITCH ATTACHMENT.

Application filed January 13, 1922. Serial No. 528,933.

My invention relates to electric service equipment and consists in the organization with the inclosing box or casing of the main service switch or controlling device of auxiliary means in the nature of an attachment or attachments to the inclosure whereby the functions of such inclosed devices can be readily and cheaply expanded to serve also the uses of fused branch blocks so as to save the expense of providing and installing the usual separate branch blocks and connecting them up to the controlling device and meter, whenever it is desired to extend branch circuits from the latter, besides affording other advantages hereinafter made apparent. According to the general practice, when a metered service is to supply various load branches, it is customary to install a branch block, generally fused, for each branch and to connect the wires from the meter to all the blocks and each pair of branch wires to one of the blocks. Such an installation ordinarily comprises a main service switch and its fuses, mounted on a base and inclosed in a box and connected to the meter, and commonly connected ahead or on the service or supply side of the meter, on which account it is customary to seal and lock the switch box to prevent the taking of unmetered current. This single piece of equipment is mounted on a wall and one or more additional and separate boxes, constituting other pieces of equipment, containing the branch blocks and their fuses, are mounted adjacent to it and wire to it and the wires of the load branches are connected to the block or blocks, the fuses of the latter being accessible so that they can be renewed by the customer. This kind of installation obviously requires considerable wall surface for installation of the several pieces and a considerable amount of labor and expense in mounting and wiring the several devices.
According to this invention the inclosure of the service switch is organized in such a way that at the option of the person in charge, it can be quickly made to accommodate and contain the junctions of several branch circuits and also the cut-outs or fuses for such branch circuits, which fuses are accessible to the customer and so that a single piece of service equipment thus performs, in and of itself, all the functions heretofore possessed by the larger installation. Furthermore, this result is accomplished with special economy of time and material, because it is brought about merely by the application to the ordinary switch box of one or more small and compact attachments, which are much smaller than the switch box and are applied to it either before the installation of the switch or afterwards, as circumstances may require and also without impairing the protective characteristics afforded by the switch inclosure. The electrical wiring of the applied attachments is simply and quickly done, inside of the main box.

The accompanying drawings illustrate the preferred form of the invention: Figure 1 shows an inclosed fused service switch of familiar type, with the cover open and two branch block attachments made according to this invention, inserted in place and connected. Figures 2 and 3 are respectively a section and rear or inside elevation of the attachment, and Figure 4 is a perspective of the box of Fig. 2 with the cover closed and the attachments confined in place thereby.

In Figure 1, the inclosing casing is a sheet metal box, comprising side, end and back walls and a removable or hinged cover which is adapted to be sealed or locked in its closed position, as indicated in Fig. 4. One of the end walls is constituted by a so-called adapter plate 1 punched with an opening to receive the projecting terminal of the meter so that the wires to and from the meter will be inclosed. Some or all of the other walls of the box are provided with ordinary knock-outs 2 or equivalent means of producing openings through them and in the casing shown, this means consists of a U-shaped section 2 of the sheet metal wall, slightly cut or punched from it or held to it by a line of weakness or otherwise so that it can be pressed or knocked out of the wall by the application of sufficient force, as well understood in this art, and thus provide a U-shaped opening or notch in the box wall. More particularly the U-shaped knock-out section contains one or more smaller, circular knock-out sections 3 of graded size and it will be understood that one or more of the set of knock-outs may be removed according to the size of the member which is to be connected with the opening so made. The circuit controlling device may consist of an ordinary fused switch structure marked 4 in the drawings and comprising an insulating base provided with the receptacles for two main fuses and with knife-blade switch members, the latter being appropriately connected to the crank part of an operating lever 5, fulcrumed in the box walls and having a handle projecting to the exterior of the box so that the switch can be opened and closed when the box is closed. Such a switch box is intended to be secured to a building wall adjacent to the entrance of the electric service wires to the building, and constitutes the main service or entrance switch, which can be opened and closed by the customer, the casing itself being closed and its contents inaccessible to him. The wires to and from this circuit controlling device may enter and leave it at any point where there is a knock-out. In the present case, the incoming service wires enter the box through a conduit secured to a knock-out opening in the back wall of the box and are each connected to one of the lower terminals of the fuse-receptacles. The upper fuse terminals are connected to the service side meter wires and the load side meter wires are connected to the upper knife-blade terminals. The two lower knife-blade terminals represent the points of connection of the outgoing load wires and in one of the uses of this switch box such wires may run direct from these terminals through one of the knock-out openings to the exterior of the box, and this is the common method of use. It is of course understood that for 3 or 4-wire circuits the construction is modified accordingly.

Such a box, or any equivalent type of inclosed service controlling device having the appropriate knock-out openings is adapted to cooperate with the attachment device of this invention to produce all the results above referred to. The said device as herein shown, in its preferred form consists of a body 6, preferably made of porcelain or other fictile insulating material and formed with an integral back flange 7 appropriately shaped or grooved, so that it can be slid into one of the notch openings produced by the removal of a knock-out section 2 and so that it will not only constitute a closure to such opening, but will itself be supported by its engagement with the adjacent margin of the box wall and be held in externally projecting relation from such wall. It may be confined against removal from its opening by the edge of the sealable cover when the latter is closed as in Figure 4.

The closure portion of the attachment body, whether constituted of a flange such as 7 or otherwise, is made of sufficient section and strength to constitute the sole support for the device when mounted on the box wall, and no other connection or supporting means is required or desirable. Furthermore, the simple operation of applying the device to its knock-out hole is all that is required to produce its adequate and permanent support on the box. The attachment carries two fuse-holding sockets, or more than two as circuit conditions require, and these are arranged on the body so that they are exposed or at least accessible from the outer side of the attachment. The fuse-receiving means shown in the drawing are adapted to hold Edison type fuse plugs, as a matter of preference and comprise for each fuse a central contact post 8, which is connected on the inner side of the closure member to a wire-connecting means or binding screw 9, and a screw shell 10 connected with another wire-connecting means or binding screw 11, also disposed on the inner side of the attachment. The insulating body 6 is moulded with appropriate recesses to accommodate all these parts as shown in the drawings and so that the two fuse-holding sockets are accessible from the outside of the box, and the four wire-connecting means therefor are within the box. When the fuse plugs are inserted in the sockets they are covered over by the hinged flap cover marked 12. This cover is usually made of insulating material and is merely to protect the fuses from dirt or accidental injury. It is not intended to be locked or sealed and can be very readily opened by releasing the snap spring 13.

In the case where the inclosed service device is to be connected to two sets of load wires or branch circuits, two of the foregoing attachments are inserted in the box, one in each of two openings formed by removing knock-out members. The wire 14 is then connected to one of the switch blade terminals (right hand in drawing) and to one of the binding screws 9 of each of the two attachments; a single piece of wire may serve this purpose, being looped around one screw 9 and extended without interruption across to the other. The corresponding wire 15 is then similarly connected to the other switch blade terminal and one of the binding screws 9 on each attachment, so thus all of the screws 9 of both attachments are connected to the switch and meter. The pair of branch load wires, marked 16, may then be connected to the binding screws 11 of one attachment and another pair 17 to the corresponding screws 11 of the other attachment and both may be led out of the box through conduits fixed to knock-out openings made on the side facing the direction in which the wires are to run.

This wiring, it will be obvious, can be very quickly done inasmuch as the opening of the box cover provides ample access and no wires have to be pulled through openings.

It will be apparent also that the fuse-receiving attachments constitute the means whereby the customer may have free access to the fuses of his load circuit, but not to any contact or wire or fuse ahead of the meter and whereby a standard form of inclosed switch is enabled to perform the service of a switch with adjacently mounted branch-blocks without occupying any greater space on the building wall and without requiring any additional mounting or anchorage on such wall or defacement thereof. The attachments can be applied to the box in any number permitted by the knock-out or equivalent openings, and regardless of the number, the branching is done within the main box thus affording an economical and superior substitute for the plural pieces of equipment heretofore generally employed. It need hardly be stated that the attachment body can be variously designed or shaped to accomplish the purposes stated, it is in any event characterized by the smallness of its size in relation to the switch box and by its facilities for optional placement in the switch box or at different points on a box and independently of any support other than its attachment connection thereto.

Claims:

1. In service switch equipment, the combination of a meter, service and load wires connected thereto, a controlling device for the circuit, an inclosing box whereby said device and wires may be protected against unauthorized connection ahead of the meter, means provided in one or more of the walls of said box whereby an opening may be formed through it, a branch block body shaped to form a closure to such opening, and adapted to be mounted and wholly supported by the box wall independently of the support on which said box is mounted, means carried on the outer side of said branch block body for removably holding a plurality of fuses, said fuses being accessible from the exterior of the box, and wire-connecting means for both sides of the branch or load circuit mounted on the inner side of said branch block body in position for connection to the wires within the box, whereby said body when applied to the casing provides the means of connection of a pair of outgoing branch or load wires to the wires from the meter, entirely within the box, and the fuses for outgoing branch or load wires are adjacent to each other and accessible to the customer.

2. In service switch equipment, the combination of a meter, service and load wires connected thereto, a fused switch for the circuit, a box for inclosing said device and said wires against access having an exterior or switch operating handle, one or more of the walls of said box being provided with means whereby an opening may be formed through it, a branch-block shaped to form a closure to such wall opening and adapted to be mounted and wholly supported by the box wall, means on said block for removably holding a plurality of fuses accessible from the exterior of the casing, and wire-connecting means for both sides of the circuit mounted on the inner side of said block in position for connection to the wires within the casing, whereby said attachment when applied to the casing may provide for the junction of a branch or load circuit with the main service wires within the casing and the fuses for such branch or load circuit are accessible to the customer.

3. In service switch equipment, the combination of a meter, service and load wires connected thereto, a fused switch for the circuit, an inclosing box for protecting said switch and said wires against unauthorized connection ahead of the meter, means in one or more of the walls of said box whereby a notch opening may be formed therein, a box attachment having a body shaped to enter and form a closure to such notch opening and to be supported wholly by the box, means on said closure body for removably holding a plurality of fuses, said fuses being accessible from the exterior of the box, wire-connecting means for both sides of the circuit mounted on the inner side of said closure body in position for connection to the wires within the box, and a box-cover for confining said body in said notch opening.

In testimony whereof, I have signed this specification.

JOSEPH SACHS.